United States Patent
Moon et al.

(10) Patent No.: US 9,679,223 B2
(45) Date of Patent: Jun. 13, 2017

(54) IMAGE PROCESSING METHOD AND APPARATUS

(71) Applicant: Samsung Electronics Co., Ltd., Suwon-si (KR)

(72) Inventors: Young-su Moon, Seoul (KR); Jong-hun Lee, Suwon-si (KR); Jung-uk Cho, Hwaseong-si (KR); Yong-min Tai, Yongin-si (KR); Do-hyung Kim, Hwaseong-si (KR); Si-hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 143 days.

(21) Appl. No.: 14/273,094

(22) Filed: May 8, 2014

(65) Prior Publication Data
US 2014/0355892 A1    Dec. 4, 2014

(30) Foreign Application Priority Data

May 31, 2013    (KR) ........................ 10-2013-0063115

(51) Int. Cl.
*G06K 9/68* (2006.01)
*G06K 9/62* (2006.01)
(Continued)

(52) U.S. Cl.
CPC .......... *G06K 9/6215* (2013.01); *G06T 5/001* (2013.01); *G06T 5/50* (2013.01);
(Continued)

(58) Field of Classification Search
None
See application file for complete search history.

(56) References Cited

U.S. PATENT DOCUMENTS 6,560,371 B1    5/2003    Zhang et al.
6,563,549 B1    5/2003    Sethuraman
(Continued)

FOREIGN PATENT DOCUMENTS

KR    10-2001-0033797    4/2001
KR    10-2001-0033798    4/2001
(Continued)

OTHER PUBLICATIONS

Mehmet K Ozkan et al., "Adaptive Motion-Compensated Filtering of Noisy Image Sequences", IEEE Transactions on Circuits and Systems for Video Technology, No. 4, Aug. 1993, pp. 270-290.*
Touraj Tajbakhsh, "Rea-time Global Motion Estimation for Video Stabilization", Proceedings of SPIE, vol. 7244, Feb. 4, 2009 (Feb. 4, 2009), p. 72440B.*
(Continued)

*Primary Examiner* — Fred Hu

(57) ABSTRACT

An image processing method includes searching for areas matching each other between a plurality of input images, the plurality of input images comprising a reference image and a target image, generating hierarchical image structures formed of a plurality of hierarchical images having different resolutions with respect to the matching areas between the plurality of input images, repeatedly performing image processing based on a similarity of values of pixels matching each other in the plurality of hierarchical images of the same level by using the hierarchical image structures generated with respect to the matching areas, and generating an output image by using pixel values according to the repeated image processing.

17 Claims, 9 Drawing Sheets

(51) Int. Cl.
*G06T 5/00* (2006.01)
*G06T 5/50* (2006.01)

(52) U.S. Cl.
CPC ........... *G06T 2207/20016* (2013.01); *G06T 2207/20021* (2013.01); *G06T 2207/20068* (2013.01); *G06T 2207/20182* (2013.01)

(56) References Cited

U.S. PATENT DOCUMENTS

| | | | |
|---|---|---|---|
| 2006/0109903 A1* | 5/2006 | Bergen | H04N 5/144 375/240.12 |
| 2013/0243319 A1 | 9/2013 | Cho et al. | |

FOREIGN PATENT DOCUMENTS

| KR | 2001-0030652 | 4/2001 |
|---|---|---|
| KR | 10-2004-0069454 | 8/2004 |
| KR | 10-2013-0104259 | 9/2013 |

OTHER PUBLICATIONS

Mehmet K Özkan et al., "Adaptive Motion-Compensated Filtering of Noisy Image Sequences", IEEE Transactions on Circuits and Systems for Video Technology, No. 4, Aug. 1993, pp. 277-290.

M. Bierling, "Displacement estimation by hierarchical blockmatching", SPIE Visual Communication and Image Processing, vol. 1001, 1988, pp. 942-951.

Touraj Tajbakhsh, "Real-Time Global Motion Estimation for Video Stabilization" Proc. of SPIE-IS&T Electronic Imaging, SPIE vol. 7244, 2009, pp. 72440B-1-72440B-12.

Ming Zhang Et Al., "Multiresolution Bilateral Filtering for Image Denoising", IEEE Transactions on Image Processing, vol. 17, No. 12, Dec. 2008, pp. 2324-2333.

Minhua Zhou et al., "Parallel Tools in HEVC for High-Throughput Processing" Proc. of SPIE, vol. 8499, 2012, pp. 849910-1-849910-13.

Extended European Search Report issued Nov. 12, 2014 in European Patent Application No. 14170599.6.

Korean Office Action dated Apr. 21, 2017 in corresponding Korean Patent Application No. 10-2013-0063115.

* cited by examiner

IMAGE PROCESSING METHOD AND APPARATUS

CROSS-REFERENCE TO RELATED APPLICATIONS

This application claims the priority benefit of Korean Patent Application No. 10-2013-0063115, filed on May 31, 2013, in the Korean Intellectual Property Office, the disclosure of which is incorporated herein in its entirety by reference.

BACKGROUND

1. Field

One or more embodiments relate to an image processing method and apparatus, and more particularly, to an image processing method and apparatus which may generate an output image with improved quality from a plurality of input images.

2. Description of the Related Art

When an image is captured by using an image capturing apparatus such as a digital camera in an inferior environment, for example, under low-light conditions or under backlight conditions, the quality of an image may be degraded. For example, when a long exposure time is set to have a sufficient amount of light for photography, a shutter speed increases and thus motion blur may occur due to movement of the image capturing apparatus or an object. Also, when photography is performed by setting a camera to a high sensitivity, a dark image is amplified with noise components so that noise increases in an image as a whole.

To prevent degradation in the quality of an image captured under low-light conditions, high-performance noise removing technology and technology for removing motion blur based on one sheet of a resultant image have been developed. Recently, technology of synthetically processing a plurality of images, rather than one sheet of an image, is under development.

SUMMARY

In an aspect of one or more embodiments, there is provided an image processing method and apparatus having an improved degradation removing function to be applied when an image with improved quality is generated by using a plurality of images.

In an aspect of one or more embodiments, there is provided an image processing method which includes searching for areas matching each other between a plurality of input images, the plurality of input images comprising a reference image and a target image, generating hierarchical image structures formed of a plurality of hierarchical images having different resolutions with respect to the matching areas between the plurality of input images, repeatedly performing image processing based on a similarity of values of pixels matching each other in the plurality of hierarchical images of the same level by using the hierarchical image structures generated with respect to the matching areas, and generating an output image by using pixel values according to the repeated image processing.

According to an aspect of one or more embodiments, there is provided at least one non-transitory computer readable medium storing computer readable instructions that when executed control one or more processors or processing elements to implement methods of embodiments.

In an aspect of one or more embodiments, there is provided an image processing apparatus which includes an image dividing unit for searching for areas matching each other between a plurality of input images, the plurality of input images comprising a reference image and a target image, an image processing unit for generating hierarchical image structures formed of a plurality of hierarchical images having different resolutions with respect to the matching areas between the plurality of input images, and repeatedly performing image processing based on a similarity of values of pixels matching each other in the plurality of hierarchical images of the same level by using the hierarchical image structures generated with respect to the matching areas, and an image combining unit for generating an output image by using pixel values according to the repeated image processing.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
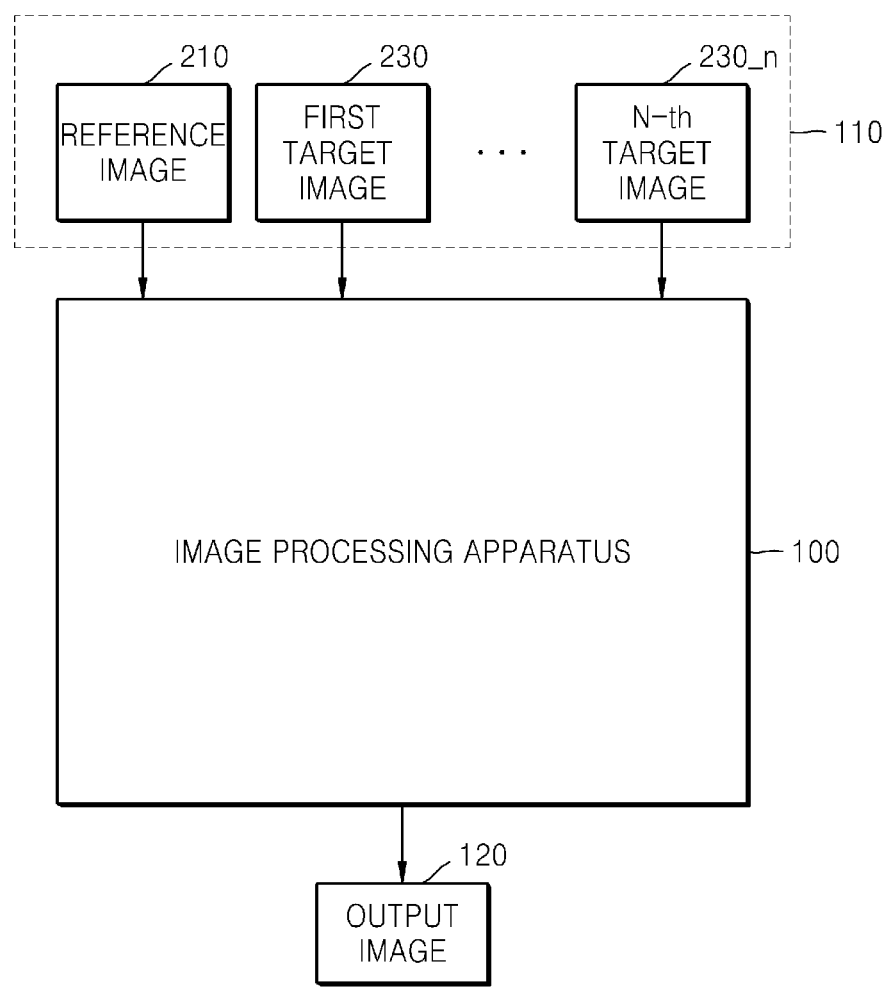
FIG. 1 schematically illustrates an image processing apparatus for generating an output image from a plurality of input images, according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 schematically illustrates an image processing apparatus 100 for generating an output image from a plurality of input images, according to an embodiment. Referring to FIG. 1, a plurality of input images 110 are obtained by photographing the same object at a time interval or at the same time. Any one of the input images 110 may be set to be a reference image 210 and the other images may be set to be a first target image 230 to an n-th first target image 230_n. The number of other images, for example, the first target image 230 to the n-th first target image 230_n, may be "n" as illustrated in FIG. 1, where "n" may be an integer greater than or equal to 1. The reference image 210 is a reference image in image processing performed by the image processing apparatus 100. The first target image 230 to the n-th first target image 230_n are the other images used for the image processing. For example, the reference image 210 may be the first one of images captured with respect to the same object, whereas a target image, for example, first target image 230, may be an image captured next to the reference image 210. The classification of the reference image 210 and the target image is not limited thereto, and the image processing apparatus 100 may determine the reference image 210 from a plurality of images randomly or according to a predetermined condition. The target image may be at least one image and the following description will be made only on the first target image 230 for convenience of explanation.

The image processing apparatus 100 may receive inputs of the reference image 210 and the first target image 230 and generate an output image 120 that is image-processed. Image quality degradation components may be included in the reference image 210 and the first target image 230 due to movement of the object or an image capturing apparatus such as a camera. The image processing apparatus 100 according to an embodiment may generate an output image having improved image quality by removing the image quality degradation components. For example, the image processing apparatus 100 may perform image processing such as noise removal, detail improvement, contrast enhancement, etc. to generate a high-quality output image.

As a resolution that may be processed by an image sensor of an image capturing apparatus such as a digital camera increases, resolutions of the input images 110 increase as well. When the input images 110 of high resolution are processed, each of the input images 110 may be processed by being divided into image areas that are smaller than an overall image size. In the image processing apparatus 100 according to an embodiment, each of the input images 110 may be divided into image areas that are smaller than an overall image size. In the following description, an image unit during image processing that is generated by dividing the input images 110 will be mainly discussed in detail.

Figure 2:
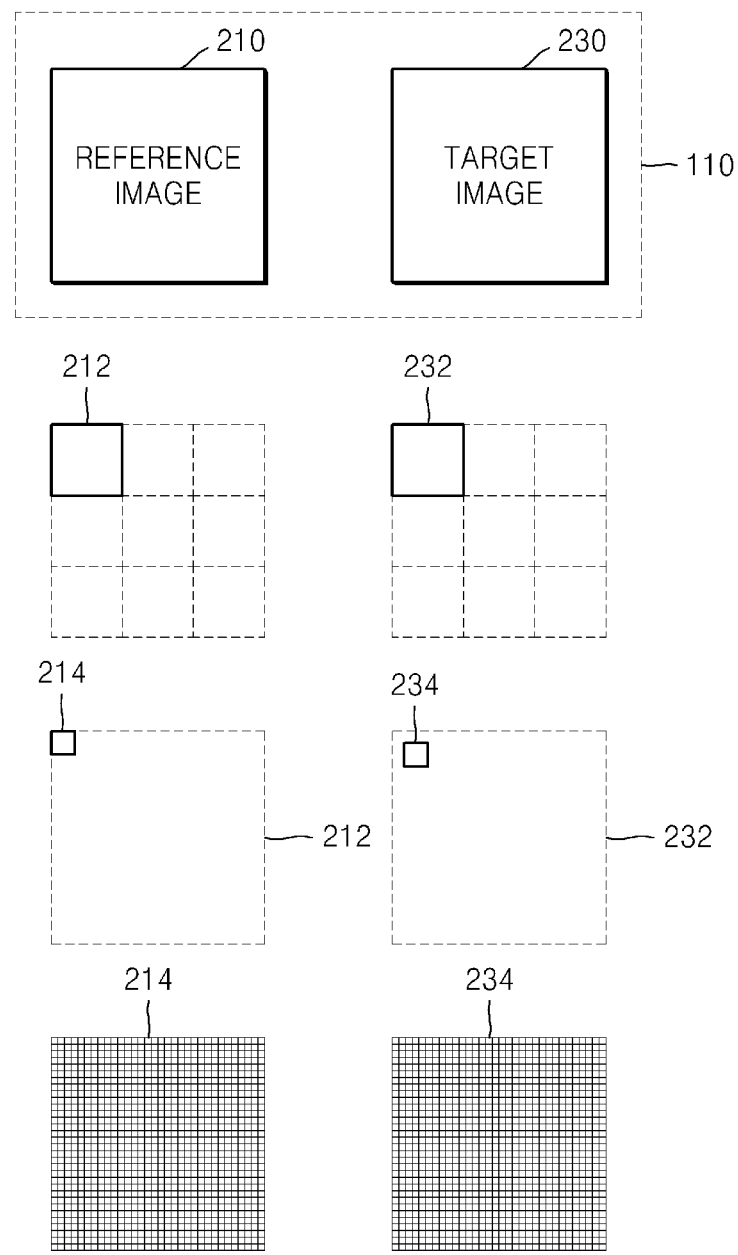
FIG. 2 schematically illustrates image processing units of input images when the input images are processed by an image processing apparatus and method according to an embodiment.

FIG. 2 schematically illustrates image processing units of input images when the input images are processed by an image processing apparatus and method according to an embodiment. Referring to FIG. 2, for image processing, the image processing apparatus 100 may divide each of the input images 110, that is, each of the reference image 210 and at least one of the target images, for example, the target image 230, to generate a plurality of tile images that are smaller than a size of each input image. Each of the tile images may be further divided into a plurality of block areas, each block area having a smaller size equivalent to a set of a plurality of pixels. The above process will be described in detail with reference to FIG. 2.

The reference image 210 may be divided into a plurality of tile images. It may be seen on the left side of FIG. 2 that the reference image 210 is divided into a plurality of 3×3 tile images. Each of the tile images generated by dividing the reference image 210 may be referred to as a reference tile image 212. Likewise, the target image 230 may be divided into a plurality of tile images. It may be seen on the right side of FIG. 2 that the target image 230 is divided into a plurality of 3×3 tile images. Each of the tile images generated by dividing the target image 230 may be referred to as a target tile image 232.

One reference tile image 212 may be divided into a plurality of block areas. One block area may be formed of a plurality of pixels. It may be seen on the left side of FIG. 2 that the reference tile image 212 includes a plurality of block areas, each block area having a smaller size than that of the reference tile image 212. Each block area generated by dividing the reference tile image 212 is referred to as a reference block area 214. The target tile image 232 may include a plurality of block areas corresponding to the block areas of the reference tile image 212. In the following description, each block area of the target tile image 232 corresponding to the reference block area 214 is referred to a target block area 234.

Each of the reference block area 214 and the target block area 234 corresponding thereto is formed of a plurality of pixels. For example, as illustrated in FIG. 2, each of the reference block area 214 and the target block area 234 may be formed of 32×32 pixels.

Matching areas between the reference tile image 212 and the target tile image 232 may be searched for through matching between the block areas. Image processing using actual pixel values may be performed on a single pixel or an area including the single pixel and an adjacent pixel to the single pixel.

Figure 3:
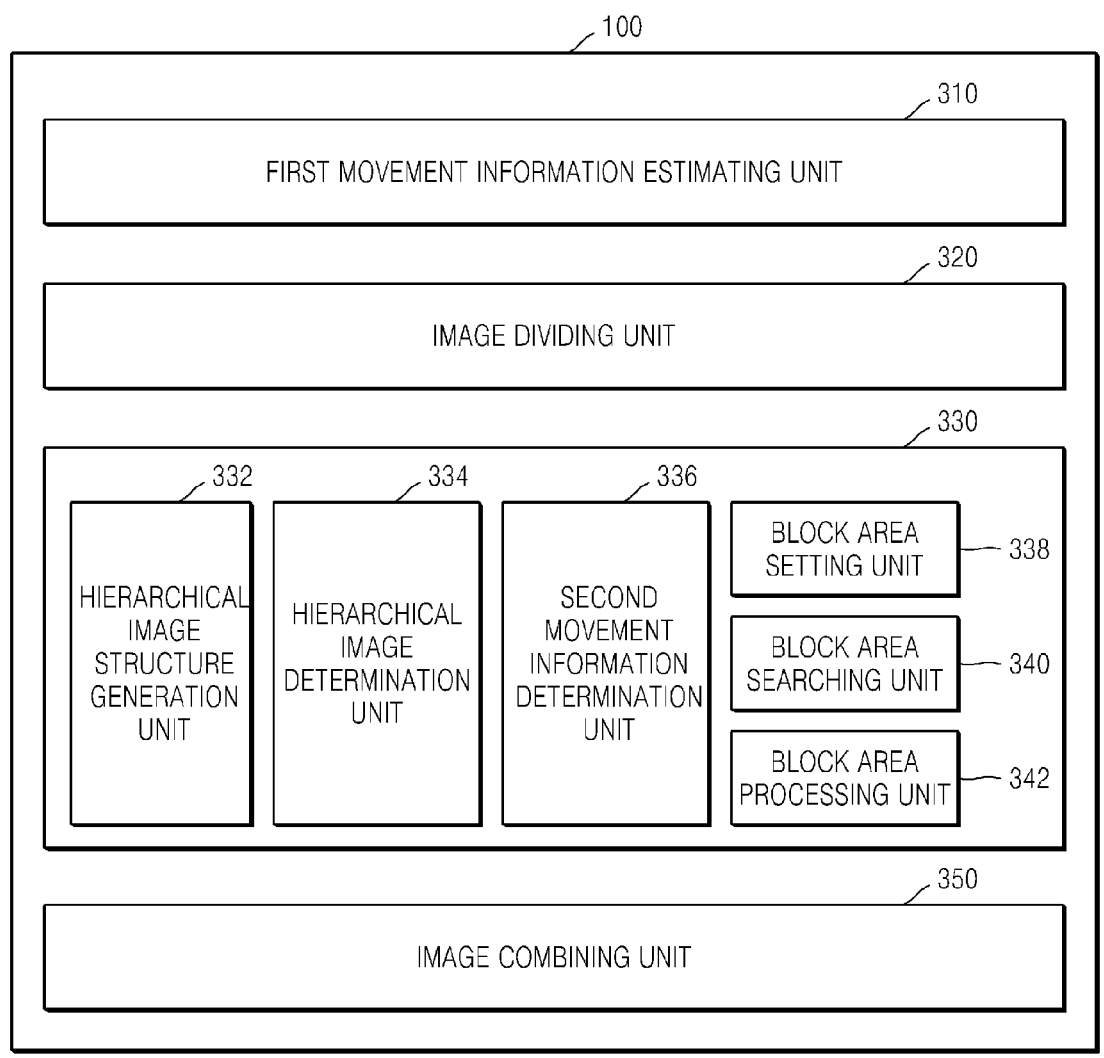
FIG. 3 is a block diagram of a detailed structure of the image processing apparatus according to an embodiment.

FIG. 3 is a block diagram of a detailed structure of the image processing apparatus 100 according to an embodiment. Referring to FIG. 3, the image processing apparatus 100 may include a first movement information estimating unit (first movement information estimator) 310, an image dividing unit (image divider) 320, an image processing unit (image processor) 330, and an image combining unit (image combiner) 350. The image processing unit 330 may include a hierarchical image structure generation unit (hierarchical image structure generator) 332, a hierarchical image determination unit (hierarchical image determiner) 334, a second movement information determination unit (second movement information determiner) 336, a block area setting unit (block area setter) 338, a block area searching unit (block area searcher) 340, and a block area processing unit (block area processor) 342.

The image processing apparatus 100 may estimate movement information between input images and perform tile image-based image processing based on the movement information, the tile image having a smaller size than that of the input image. The image processing apparatus 100 may estimate movement information about the entire image from the reference image 210 and the target image 230 and stably perform the tile image-based image processing by applying the estimated movement information to processing for each tile image. Also, when features of a tile image are small or no pattern exists, the image processing apparatus 100 may more accurately estimate movement information between tile images based on global movement information between input images. For the tile image-based image processing, block areas and pixels that are smaller units than the tile image as illustrated in FIG. 2 may be used for the tile image-based image processing. Referring to FIG. 3, detailed structures of the image processing apparatus 100 and a function performed by each structure are described below.

The first movement information estimation unit 310 may estimate first movement information indicating a degree of movement of the target image 230 with respect to the reference image 210. The first movement information may indicate global movement between the reference image 210 and the target image 230. The first movement information estimation unit 310 may estimate how much positional difference the target image 230 has relative to the reference image 210. The first movement information estimated as above may be used for setting a search area within the target tile image 232 during estimation of second movement information indicating a degree of movement of the target tile image 232 with respect to the reference tile image 212 having a smaller size than that of each of the reference image 210 and the target image 230. When the first movement information estimation unit 310 is not included, the first movement information may not be obtained. Accordingly, the entire area of the target tile image 232 is searched to estimate the second movement information so that speed and efficiency may deteriorate and a time for performing image processing may be generally increased.

The first movement information estimation unit 310 may generate an accumulated image one-dimensional (1D) curve in a horizontal direction and an accumulated image 1D curve in a vertical direction, respectively, formed of accumulated pixel values for each column and each row of the reference image 210, and an accumulated image 1D curve in the horizontal direction and an accumulated image 1D curve in the vertical direction, respectively, formed of accumulated pixel values for each column and each row of the target image 230. In detail, the first movement information estimation unit 310 may sum pixel values of all pixels located in a certain column while moving in the horizontal direction or a direction x of an image with respect to the reference image 210 and the target image 230, and generate accumulated image 1D curves 410 and 420 (see FIG. 4A) in the horizontal direction by displaying a result of the sum as a height value on a 1D curve. Also, the first movement information estimation unit 310 may sum pixel values of all pixels located in a certain row while moving in the vertical direction or a direction y of an image with respect to the reference image 210 and the target image 230, and generate accumulated image 1D curves 450 and 460 (see FIG. 4B) in the vertical direction by displaying a result of the sum as a height value on a 1D curve in the same manner.

The first movement information estimation unit 310 may estimate the first movement information by comparing a pattern between the accumulated image 1D curve in the horizontal direction that is generated by connecting the accumulated pixel values for each column of the reference image 210 and the accumulated image 1D curve in the horizontal direction that is generated by connecting the accumulated pixel values for each column of the target image 230 and then comparing a pattern between the accumulated image 1D curve in the vertical direction that is generated by connecting the accumulated pixel values for each row of the reference image 210 and the accumulated image 1D curve in the vertical direction that is generated by connecting the accumulated pixel values for each row of the target image 230.

The first movement information estimation unit 310 may set a search area based on the accumulated pixel values on the accumulated image 1D curve in the horizontal direction of the reference image 210, and search the search area for a relative position where a degree of correlation between the accumulated pixel values in the horizontal direction with respect to the reference image 210 and the accumulated pixel values in the horizontal direction with respect to the target image 230 is maximum. The first movement information estimation unit 310 may estimate movement of the target image 230 with respect to the horizontal direction by using a relative position where the degree of correlation is maximum. The first movement information estimation unit 310 may set a search area based on the accumulated pixel values on the accumulated image 1D curve in the vertical direction of the reference image 210, and search the search area for a relative position where a degree of correlation between the accumulated pixel values in the vertical direction with respect to the reference image 210 and the accumulated pixel values in the vertical direction with respect to the target image 230 is maximum, thereby estimating movement of the target image 230 with respect to the vertical direction. The first movement information estimation unit 310 may use various techniques including normalized cross correlation (NCC) to estimate a degree of correlation. The first movement information estimation will be further described with reference to FIG. 4.

Figure 4A:
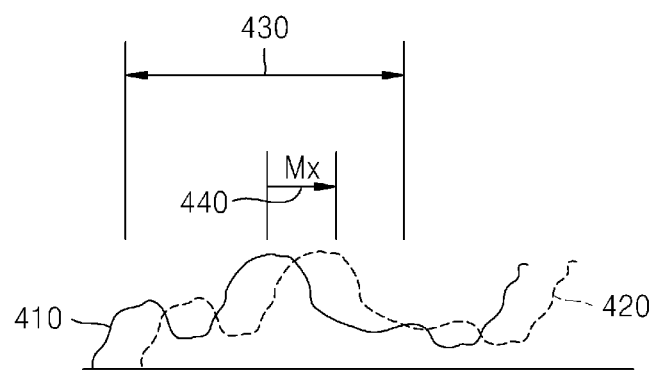
FIGS. 4A and 4B illustrate an embodiment of estimating first movement information.
Figure 4B:
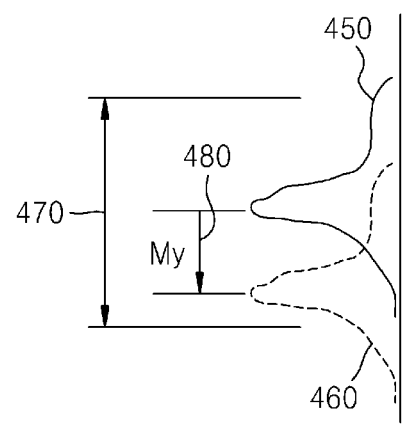

FIGS. 4A and 4B illustrate an embodiment of estimating the first movement information. Referring to FIGS. 4A and 4B, an embodiment of estimating the first movement information is illustrated as one in which the first movement information estimation unit 310 of the image processing apparatus 100 compares a pattern between the accumulated image 1D curves 410 and 420 in the horizontal direction of the reference image 210 and the target image 230 and compares a pattern between the accumulated image 1D curves 450 and 460 in the vertical direction of the reference image 210 and the target image 230.

FIG. 4A illustrates the accumulated image 1D curve 410 of the reference image 210 and the accumulated image 1D curve 420 of the target image 230 in the horizontal direction. The first movement information estimation unit 310 may set a search area 430 with respect to the accumulated image 1D curve 410 of the reference image 210. For example, the first movement information estimation unit 310 may set the search area 430 with respect to a maximal point, a minimal point, or an inflection point of the accumulated image 1D curve 410 of the reference image 210. The first movement information estimation unit 310 may search for a relative position where a degree of correlation between the accumulated image 1D curve 410 of the reference image 210 and the accumulated image 1D curve 420 of the target image 230 in the search area 430 is maximum. The accumulated image 1D curve 410 of the reference image 210 and the accumulated image 1D curve 420 of the target image 230 may have a maximum similarity at the found relative position. The first movement information estimation unit 310 may estimate a size Mx 440 of movement with respect to the horizontal direction based on the relative position where a degree of correlation is maximum.

As illustrated in FIG. 4B, the first movement information estimation unit 310 may set a search area 470 in the same manner as that in FIG. 4A with respect to the accumulated image 1D curve 450 of the reference image 210 and the accumulated image 1D curve 460 of the target image 230, and estimate a size My 480 of movement with respect to the vertical direction based on the relative position where a degree of correlation between the accumulated image 1D curve 450 of the reference image 210 and the accumulated image 1D curve 460 of the target image 230 is maximum.

As such, when the global movement between the reference image 210 and the target image 230 is translational movement, the first movement information estimation unit 310 of the image processing apparatus 100 may estimate the first movement information based on the size Mx 440 of the movement in the horizontal direction and the size My 480 of the movement in the vertical direction.

The first movement information estimation unit 310 may set a plurality of movement search areas for estimating movement in the reference image 210 and the target image 230 to process not only translational movement but also an extended kinetic model. The first movement information estimation unit 310 may estimate the first movement information in the set movement search areas by comparing the accumulated pixel values between the reference image 210 and the target image 230 in the horizontal and vertical directions. For example, when movement search areas are set in the upper, lower, left, and right sides of an input image, the first movement information estimation unit 310 may estimate how far the target image 230 moves relative to the reference image 210 at a position of each movement search area. The first movement information estimation unit 310 may estimate rotational movement of the target image 230 by analyzing a degree of movement in the four movement search areas.

Referring back to FIG. 3, the image dividing unit 320 may divide the input images 110, that is, the reference image 210 and the target image 230, respectively into the reference tile images 212 and the target tile images 232. The image dividing unit 320 may divide the reference image 210 into the reference tile images 212, each having a size that is smaller than that of the reference image 210, and may divide the target image 230 into the target tile images 232, each having a size that is smaller than that of the tile image 230. In particular, when the input image is an image of an ultra-high resolution, the input image is divided into a plurality of tile images and a parallel process using a multi-core may be performed on the tile images.

The image dividing unit 320 may set the size of the reference tile image 212 such that areas of the neighboring reference tile images 212 overlap each other, and divide the reference image 210 based on the size of the set reference tile image 212. Also, when the target image 230 is divided into the target tile images 232, the image dividing unit 320 may set the size of the target tile image 232 such that areas of the neighboring target tile images 232 overlap each other, and divide the target image 230 based on the size of the set target tile image 232. The image processing apparatus 100 may prevent image quality degradation by blending an overlapping area when the image-processed tile images are combined later.

The image processing unit 330 may perform image processing based on a tile image having a smaller size than that of an input image. In detail, the image processing unit 330 may perform image processing such as noise removal, detail improvement, or contrast enhancement on a tile image based on a degree of movement estimated for each tile image with respect to a hierarchical image structure of the reference tile image 212 and a hierarchical image structure of the target tile image 232. In doing so, a series of image processes may be performed from the highest level to the lowest level with respect to the hierarchical image structures of the reference tile image 212 and the target tile image 232, and a result of image processing at a certain level may be used for image processing at a next lower level may be used. The block areas and pixels that are smaller units than the tile image as illustrated in FIG. 2 may be used for the tile image-based image processing.

The hierarchical image structure generation unit 332 may generate hierarchical image structures for the reference tile image 212 and the target tile image 232. For example, the hierarchical image structure may be a Gaussian pyramid, a Laplacian pyramid, etc. The Gaussian pyramid may be used to reduce the number of calculations. The image processing unit 330 may perform fast and stable image processing by performing a series of image processes based on the hierarchical image structure of the reference tile image 212 and the hierarchical image structure of the target tile image 232, which are generated by the hierarchical image structure generation unit 332.

For convenience of explanation, it is assumed in the following description that the hierarchical image structure of a tile image is a Gaussian pyramid having a three-level hierarchical image structure. The Gaussian pyramid is a hierarchical image structure in which an image of the highest level has the lowest resolution, an image of the lowest level has the highest resolution, and each level has a different resolution. For example, for a three-level Gaussian pyramid, when the size of an image of the lowest level is H×W, the size of an image of a medium level is H/2×W/2 and the size of an image of the highest level is H/4×W/4.

The hierarchical image structure generation unit 332 may generate a hierarchical image structure for each image channel forming the reference tile image 212 or the target tile image 232 with respect to the reference tile image 212 and the target tile image 232. This will be described below in detail with reference to FIG. 5.

Figure 5:
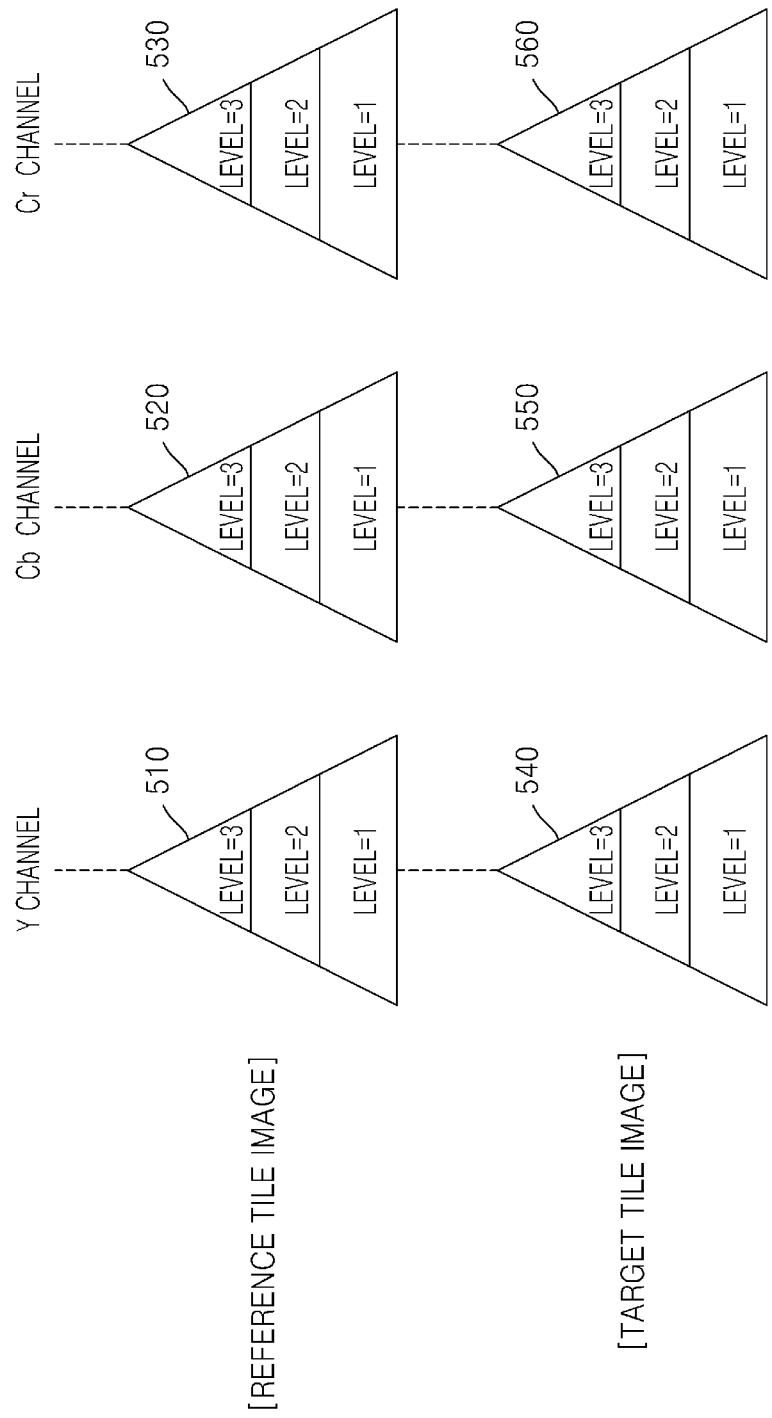
FIG. 5 illustrates an embodiment of a hierarchical image structure generated for each image channel.

FIG. 5 illustrates an embodiment of a hierarchical image structure generated for each image channel. Referring to FIG. 5, the hierarchical image structure generation unit 332 may generate a hierarchical image structure for each image channel that forms the reference tile image 212 and the target tile image 232. The hierarchical image structure generation unit 332 may generate a hierarchical image structure for each color channel such as RGB color, YCbCr color, La*b* color, etc. For example, when the reference tile image 212 and the target tile image 232 have a YCbCr color space, as illustrated in FIG. 5, the reference tile image 212 may have a hierarchical image structure 510 of a Y channel, a hierarchical image structure 520 of a Cb channel, and a hierarchical image structure 530 of a Cr channel, and the target tile image 232 may have a hierarchical image structure 540 of the Y channel, a hierarchical image structure 550 of the Cb channel, and a hierarchical image structure 560 of the Cr channel.

The image processing unit 330 may apply a result of image processing on any one image channel to image processing of the other image channels. For example, the image processing unit 330 may apply results of the image processing in the hierarchical image structures 510 and 540 of the Y channel to the image processing in the hierarchical image structures 520 and 550 of the Cb channel. When the reference tile image 212 and the target tile image 232 are in a YCbCr444 format, the image processing unit 330 may apply a size of movement produced in the image processing of the Y channel to the image processing of the Cb channel and the Cr channel without a change. When the reference tile image 212 and the target tile image 232 are in a YCbCr422 format, the image processing unit 330 may adjust the size of movement produced in the image processing of the Y channel and apply the adjusted size to the image processing of the Cb channel and the Cr channel. For example, the size of an image of the luminance channel (Y channel) is H (horizontal)×W (width) (OK?), and the size of an image of the chroma channel (Cb channel and Cr channel) is H (horizontal)×W/2 (width) (OK?), the image processing apparatus 100 may apply a size of movement in the horizontal direction of the size of movement produced in the image processing of the luminance channel to the chroma channel without a change and apply a size of movement in the vertical direction to the chroma channel by reducing the size to half.

Referring back to FIG. 3, the hierarchical image determination unit 334 may determine hierarchical image information of a current level by reflecting an image processing result of a previous level in an image of each level forming a hierarchical image structure from an image of an upper level to an image of a lower level. For the highest level, since no previous level exists, hierarchical image information of the highest level is used without a change. When a level is not the highest level, new hierarchical image information of a current level may be determined by projecting a differential image between the image information of a result of the image processing at a previous upper level and hierarchical image information before the image processing toward a current level to be reflected in the hierarchical image information of the current level.

The second movement information determination unit 336 may determine second movement information indicating a degree of movement of the target tile image 232 relative to the reference tile image 212. The second movement information determination unit 336 may estimate or update the second movement information with respect to image of the same level in a hierarchical image structure of the reference tile image 212 and the hierarchical image structure of the target tile image 232. For example, the second movement information determination unit 336 may estimate the second movement information by using a method similar to the method that is used by the first movement information estimation unit 310 to estimate the first movement information, with respect to the image of each level in the hierarchical image structure. As another example, the second movement information determination unit 336 may estimate the second movement information by using a method similar to the method that is used by the first movement information estimation unit 310 to estimate the first movement information only for the images of the highest level, and simply update the second movement information of a current level by using the second movement information of a previous level with respect to the images that are not the highest level.

In the hierarchical image structure for each of the reference tile image 212 and the target tile image 232, the second movement information determination unit 336 may estimate the second movement information by comparing a pattern between an accumulated image 1D curve in the horizontal direction that is generated by connecting the accumulated pixel values for each column of the reference tile image 212 and an accumulated image 1D curve in the horizontal direction that is generated by connecting the accumulated pixel values for each column of the target tile image 232 and then comparing a pattern between an accumulated image 1D curve in the vertical direction that is generated by connecting the accumulated pixel values for each row of the reference tile image 212 and an accumulated image 1D curve in the vertical direction that is generated by connecting the accumulated pixel values for each row of the target tile image 232. However, the second movement information determination unit 336 may use the first movement information estimated by the first movement information estimation unit 310 as basic information and use the basic information as a default value for estimating a degree of movement of each tile image. In other words, a search area may be set based on the default value of movement produced from the first movement information. Accordingly, the search area in the target tile image 232 may be reduced and movement may be estimated more accurately.

Figure 6A:
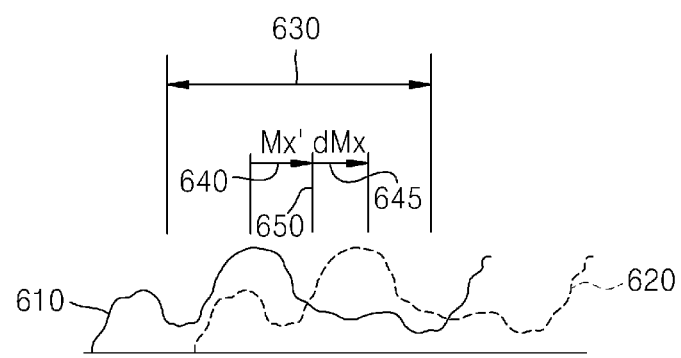
FIGS. 6A and 6B illustrate an embodiment of estimating second movement information.
Figure 6B:
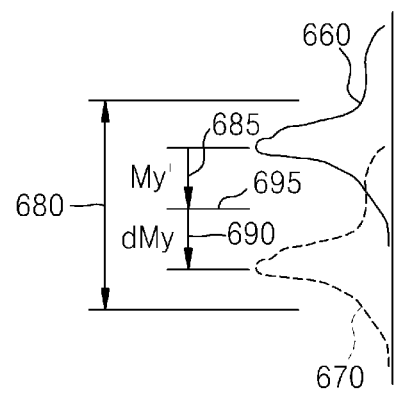

FIGS. 6A and 6B illustrate an embodiment of estimating the second movement information. Referring to FIGS. 6A and 6B, the second movement information may be estimated as the second movement information determination unit 336 of the image processing apparatus 100 compares a pattern between the accumulated image 1D curves in the horizontal direction of the reference tile image 212 and the target tile image 232 and then compares a pattern between the accumulated image 1D curves in the vertical direction of the reference tile image 212 and the target tile image 232.

FIG. 6A illustrates an accumulated image 1D curve 610 of the reference tile image 212 and an accumulated image 1D curve 620 of the target tile image 232 in the horizontal direction. The second movement information determination unit 336 may set a search area 630 with respect to the accumulated image 1D curve 610 of the reference tile image 212. The second movement information determination unit 336 may set a search area based on a movement default value produced from the first movement information. For example, when the second movement information determination unit 336 estimates movement in the horizontal direction, the second movement information determination unit 336 may set a center position 650 of the search area 630 based on a default value Mx' 640 of movement in the horizontal direction that is produced from the first movement information. The second movement information determination unit 336 may estimate a size dMx 645 of movement in the horizontal direction by using a relative position where a degree of correlation between the accumulated image 1D curve 610 of the reference tile image 212 and the accumulated image 1D curve 620 of the target tile image 232 is maximum, in the search area 630.

As illustrated in FIG. 6B, the second movement information determination unit 336 may set a center position 695 of a search area 680 based on a default value My' 685 of movement in the vertical direction that is produced from the first movement information with respect to an accumulated image 1D curve 660 of the reference tile image 212 and an accumulated image 1D curve 670 of the target tile image 232 in the vertical direction. The second movement information determination unit 336 may estimate a size dMy 690 of movement in the vertical direction based on a relative position where a degree of correlation between the accumulated image 1D curve 660 of the reference tile image 212 and the accumulated image 1D curve 670 of the target tile image 232 in the vertical direction is maximum, in the search area 680.

The second movement information determination unit 336 may estimate the second movement information based on the default value Mx' 640 of movement in the horizontal direction that is produced from the first movement information, the default value My' 685 of movement in the vertical direction that is produced from the first movement information, the size dMx 645 of movement in the horizontal direction, and the size dMy 690 of movement in the vertical direction. For example, the sizes Mx and My of final movement with respect to the horizontal direction and the vertical direction included in the second movement information may be expressed by the following equations:

$$MX = Mx' + dMx \quad \text{[Equation 1]}$$

$$MY = My' + dMy \quad \text{[Equation 2]}$$

Referring back to FIG. 3, the block area setting unit 338 may set a plurality of block areas each having a smaller size than that of the reference tile image 212 to process local movement in the reference tile image 212 and the target tile image 232. For example, the block area setting unit 338 may divide the reference tile image 212 into a plurality of block areas having a size of 8×8, 25×25, etc. One block area corresponds to a set of a plurality of pixels, for example, 32×32 pixels. The block area setting unit 338 may set the block areas with respect to an image of each level in the hierarchical image structure for the reference tile image 212.

The block area searching unit 340 may search the block areas of the target tile image 232 that match the block areas of the reference tile image 212. The block area searching unit 340 may search the block areas having a pattern matching a pattern of the block areas of the reference tile image 212 in the search area set based on the second movement information. In this case, the block area searching unit 340 may set a search area based on the second movement information that is updated by using the second movement information that is estimated by the second movement information determination unit 336 or the second movement information of a previous level, and search the block areas having a pattern matching a pattern of the block areas of the reference tile image 212 in the search area. Also, the block area searching unit 340 may set block areas matching each other by using third movement information that indicates a degree of movement of a block area of the target tile image 232 with respect to a block area of the reference tile image 212.

For example, the block area searching unit 340 may set a search area in the target tile image 232 based on a result of summing a size of movement included in the second movement information and a size of movement included in the third movement information. The block area searching unit 340 may search a matching block area in a limited search area by setting a position in the target tile image 232 to which the sum result is applied as a center position.

The block area searching unit 340 may use a similarity determinant based on various image blocks, such as sum of squared difference (SSD), sum of absolute difference (SAD), etc. to search a matching block area. The accuracy in the determination of similarity may be improved by using not only luminance information but also chromatic information of an image. The block area searching unit 340 may determine a position where a similarity is maximized or minimized by using the similarity determinant. Also, the block area searching unit 340 may use a fixed or variable threshold value, to determine a case when there is no matching block area by occlusion or unocclusion between the reference tile image 212 and the target tile image 232. In other words, the block area searching unit 340 may determine whether there is a matching block area by comparing the threshold value and the similarity determinant.

When the search process in the target tile image 232 is completed, the matching block areas may be searched by as many times as the number of input target images 230 with respect to each block area of the reference tile image 212. When the block area searching unit 340 uses the threshold value and the similarity determinant, block areas may be searched for regardless of the number of input target images 230. For example, when the block area searching unit 340 may search for the block areas of the target tile image 232 as matching block areas when the similarity between the block areas of the reference tile image 212 and the block areas of the target tile image 232 is greater than the threshold value, a plurality of matching block areas or no matching block area may exist in one target image 230.

Figure 7:
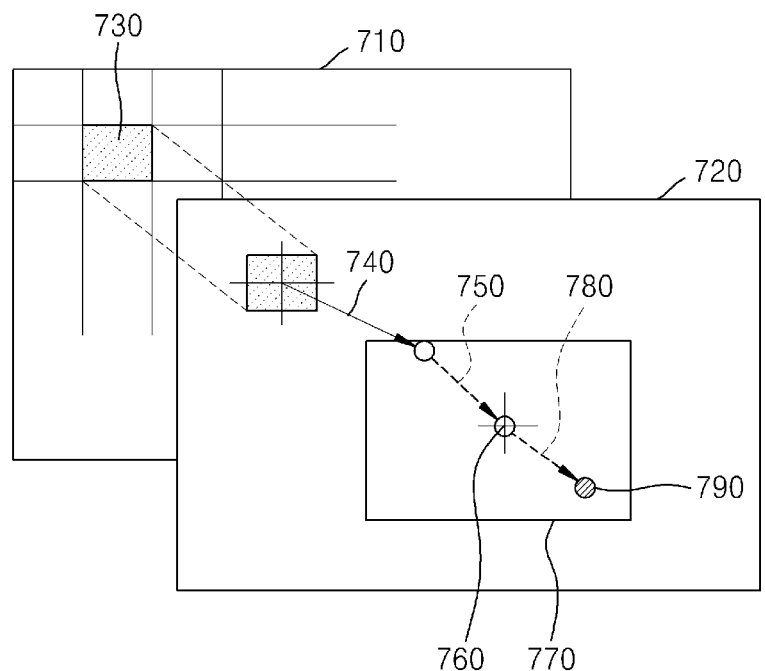
FIG. 7 illustrates an embodiment of setting a block area of a reference tile image and searching for a block area of a target tile image matching the block area of the reference tile image.

FIG. 7 illustrates an embodiment of setting a block area of a reference tile image 710 and searching for a block area of a target tile image 720 matching the block area of the reference tile image 710. Referring to FIG. 7, the block area setting unit 338 may divide the reference tile image 710 into a plurality of block areas and set any one of the block areas as a block area 730. The setting of the block area 730 may be sequentially performed in the divided block areas.

The block area searching unit 340 may search for a block area of the target tile image 720 that matches the block area 730 set in the reference tile image 710. The block area searching unit 340 may set a center position 760 of a search area 770 by using a size 740 of movement included in the target tile image 720 and a default value 750 of the third movement information of a particular block area. The default value 750 of the third movement information may be based on a result of processing at each level of the hierarchical image structure. The block area searching unit 340 may search for a position 790 having the largest similarity in the search area 770 and calculate a displacement quantity 780 from the center position 760. Accordingly, the third movement information that is newly estimated may be determined based on the default value 750 of the third movement information and the displacement quantity 780.

For example, when the default value 750 of the third movement information is (Lx', Ly') and the displacement quantity 780 from a center position 1060 is (dLx, dLy), the third movement information (Lx, Ly) may correspond to (Lx'+dLx, Ly'+dLy).

Referring back to FIG. 3, the block area processing unit 342 may perform image processing on a tile image by using pixel values of the block areas of the reference tile image 212 and pixel values of the block areas searched from the target tile image 232. The block area processing unit 342 may perform image processing such as noise removal, detail improvement, contrast enhancement, etc. by using pixel values of the matching block areas between the reference tile image 212 and the target tile image 232.

For example, the block area processing unit 342 may repeatedly perform image processing on all block areas of the reference tile image 212 based on the similarity of the pixel values of the matching block areas between the reference tile image 212 and the target tile image 232. A third movement information estimation operation based on the block area may be performed altogether.

When the block area processing unit 342 completes image processing on all block areas of the reference tile image 212, whether a current level is the lowest level may be determined by checking a level of a hierarchical image, on which image processing is currently completed, in the hierarchical image structure. The block area processing unit 342 may check the level of the hierarchical image structure and, if the current level is the lowest level, repeatedly perform image processing on another reference tile image 212 in the same manner. Otherwise, if the current level is not the lowest level, the block area processing unit 342 may perform image processing of the current level on a hierarchical image of one level lower than the current level in the image processing method performed in the previous level. The block area processing unit 342 may use the second movement information and the third movement information that are results of the image processing performed in the previous level as a default value for determining movement information regarding an image of the current level, based on the image processing of the current level. Before the block area processing unit 342 performs image processing on a hierarchical image of the current level that is one level lower than the level of the hierarchical image structure, the block area processing unit 342 may determine a new hierarchical image of the current level by reflecting to a hierarchical image before the image processing of the current level one obtained by projecting a differential image between an image as a result of the image processing at the previous level and an image before the image processing at the previous level in the hierarchical image structure from the previous level to the current level. In other words, new image information of the current level to be used for image processing may be determined by performing an up-scaling process such that the differential image according to the image processing at the previous level has the same size as that of the image of the current level and then synthesizing an up-scaled image with the image of the current level. As such, according to the hierarchical image structure, the horizontal and vertical lengths of the differential image after the projection to a level that is one level lower than the differential image, that is, the differential image after the up-scaling process may be increased twice. The block area processing unit 342 may repeatedly perform a series of movement estimation and image processing on all block areas with the determined new hierarchical image of the current level as an input image and output a resultant image of the current level. The block area processing unit 342 may double the size of the movement information produced at the previous level and use the doubled size information as a default for estimating the movement information of the current level.

Figure 8:
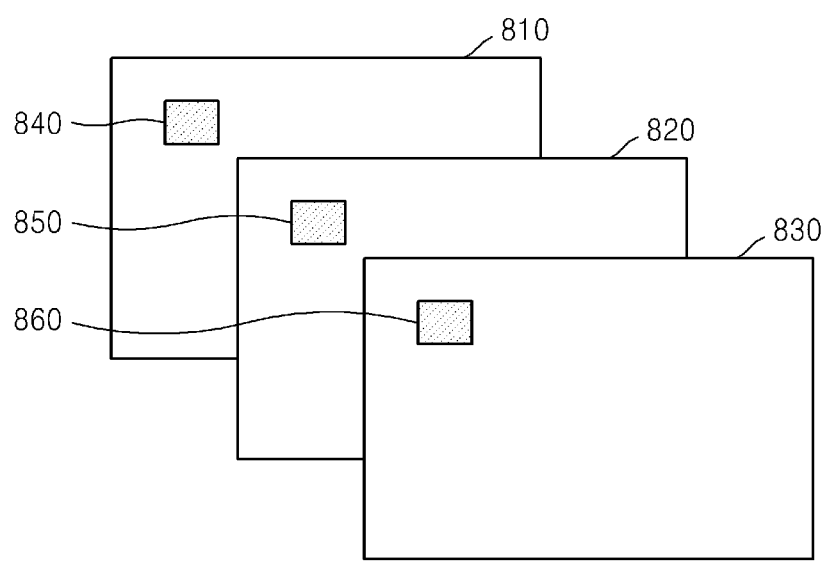
FIG. 8 illustrates an operation of performing image processing by using a block area of a reference tile image and a block image of a target tile image matching the block area of the reference tile image.

FIG. 8 illustrates an operation of performing image processing by using a block area of a reference tile image and a block area of a target tile image matching the block area of the reference tile image. Referring to FIG. 8, a reference tile image 810 and a plurality of target images 820 and 830 are illustrated. Also, block areas 850 and 860 of the target images 820 and 830 match a particular block area 840 of the reference tile image 810. The block area processing unit 342 may perform image processing such as noise removal, detail improvement, contrast enhancement, etc. by using pixel values of the matching block areas 840, 850, and 860 between the reference tile image 810 and the target tile images 850 and 860. For example, the block area processing unit 342 may calculate image-processed pixel values by calculating a representative value of the matching pixel values included in the input images 110 by using a different weighted value in a method of increasing a weighted value of a pixel value included in the block areas 850 and 860 that are matching block areas of the target tile images 820 and 830 as the pixel values of the block areas 850 and 860 are similar to a pixel value included in the block area 840 of the reference tile image 810, based on the similarity of pixel values of the matching block areas between the reference tile image 810 and the target tile images 820 and 830. The block area processing unit 342 may repeatedly perform the image processing on all block areas of the reference tile image 810, thereby removing noise of an image.

In the above image processing method in which a pixel value is calculated by using a different weighted value based on the similarity of pixel values, a function of removing degradation due to large local movement is superior compared to a block area-based image processing method. In other words, ghost degradation may be naturally and smoothly removed by using any value between 0 and 1 as a weighted value. For example, the ghost degradation may be removed by using a temporal bilateral filter. The determination of similarity in units of pixels may be performed on a single pixel or on an area including adjacent pixels neighboring the single pixel, by using an SAD or SSD method. In doing so, not only luminance information but also chromatic information of an image is used so that accuracy in the determination of similarity may be improved. Even when image processing is performed based on an area including adjacent pixels neighboring a single pixel, ghost degradation is highly likely to be removed compared to the image processing based on block areas having a quite large number of pixels.

For example, when there is a vehicle that is moving fast in the input images 110, local movement having a larger size than a search area for estimating movement may generate degradation. For the image processing method in which a pixel value is calculated by using a different weighted value based on the similarity of pixel values, an effective image processing is available with respect to the generation of degradation.

Referring back to FIG. 3, the image combining unit 350 may combine tile images that are image processed. The image combining unit 350 may generate one output image 120 having an improved image quality by combining the image-processed reference tile images. The image combining unit 350 may remove image quality degradation at a boundary portion by blending an area where the image-processed reference tile images overlap each other. For example, the image combining unit 350 may perform blending at the boundary portion by using two memory maps of a weighted value memory map and a weighted value image memory map.

Although it is not illustrated in FIG. 3, a pre-processing unit for pre-processing the input images 110 may be further provided in or outside the image processing apparatus 100. For example, when luminances of the reference image 210 and the target image 230 are different, the luminance of the target image 230 may be changed to match the luminance of the reference image 210. The pre-processing unit may determine whether correction of the luminance of the target image 230 is needed based on exposure information of the reference image 210 and the target image 230 or a luminance distribution deviation between the reference image 210 and the target image 230. If it is determined that the correction of the luminance of the target image 230 is needed, luminance change or luminance correction may be performed on the target image 230 such that a luminance distribution of the target image 230 is similar to a luminance distribution of the reference image 210. In other words, the luminance change of the target image 230 may be performed by using a luminance change relationship between the reference image 210 and the target image 230 that is produced through histogram matching.

Figure 9:
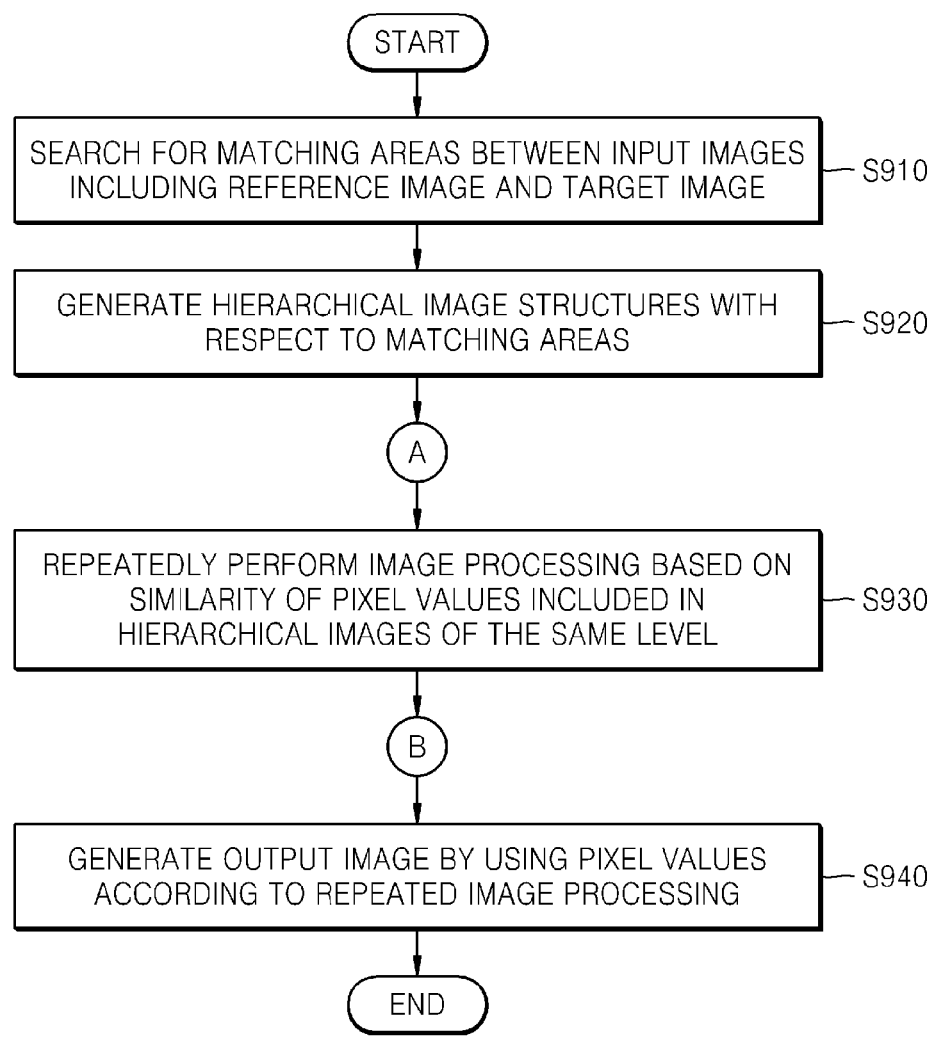
FIG. 9 is a flowchart for explaining operations of an image processing method according to an embodiment.

FIG. 9 is a flowchart for explaining operations of an image processing method according to an embodiment. In the following description, although omitted herein, the above descriptions of the image processing apparatus 100 may be applied to an image processing method according to an embodiment.

Referring to FIG. 9, the image processing apparatus 100 may search for matching areas between the input images 110 including the reference image 210 and the target image 230 (S910). For example, the image processing apparatus 100 may divide the reference image 210 and the target image 230, respectively, into a plurality of reference tile images and a plurality of target tile images, and match the reference tile image to the target tile images considering the position of each of the reference tile images.

The image processing apparatus 100 may generate hierarchical image structures formed of a plurality of hierarchical images having different resolutions with respect to the respective matching areas between the input images 110 (S920). The image processing apparatus 100 may generate hierarchical image structures for the respective image channels that form the areas of the input images 110.

The image processing apparatus 100 may repeatedly perform image processing based on the similarity of pixel values included in the hierarchical images of the same level by using the hierarchical image structures generated with respect to the respective matching areas (S930). In detail, the image processing apparatus 100 may repeatedly perform image processing by using a different weighted value of the pixels included in the hierarchical images generated with respect to the respective areas of the target image 230 according to the similarity between the matching pixel values included in the hierarchical images generated with respect to the respective areas of the reference image 210 and the target image 230. For example, the image processing apparatus 100 may repeatedly obtain a weighted average of the matching pixels included in the hierarchical images by increasing the weighted value of a pixel value included in the hierarchical images generated with respect to the respective areas of the target image 230 as the similarity of the values of the pixels included in the hierarchical images generated with respect to the respective areas of the reference image 210 and the values of the pixels included in the hierarchical images generated with respect to the respective areas of the target image 230 that matches the respective areas of the reference image 210 increases.

The image processing apparatus 100 may use the luminance information and the chromatic information of the matching pixel values included in the hierarchical images respectively generated with respect to the respective areas of the reference image 210 and the target image 230 in the determination of the similarity between the matching pixel values included in the hierarchical images respectively generated with respect to the respective areas of the reference image 210 and the target image 230.

The image processing apparatus 100 may repeatedly perform image processing by using a result of image processing at a certain level of the hierarchical image structures from the highest level to the lowest level for image processing of a next lower level. The hierarchical image structure may be a Gaussian pyramid image structure.

The image processing apparatus 100 may estimate the second movement information between the respective matching areas based on the first movement information between the reference image 210 and the target image 230, and search for matching pixels included in the hierarchical images based on the second movement information.

Figure 10:
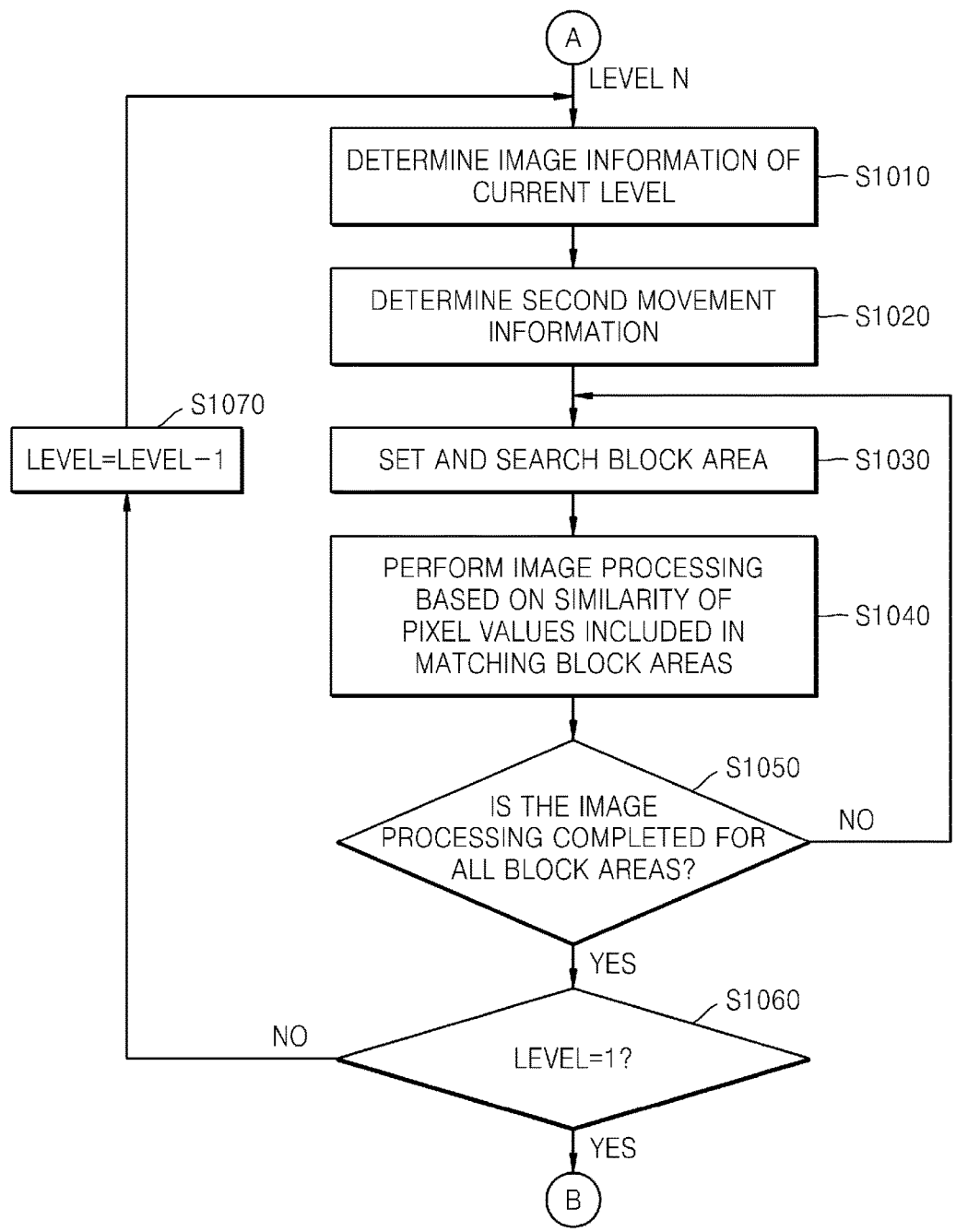
FIG. 10 is a flowchart for explaining in detail operations of an embodiment of repeatedly performing image processing by using hierarchical image structures generated with respect to the respective areas corresponding to each other between input images.

FIG. 10 is a flowchart for explaining in detail operations of an embodiment of repeatedly performing image processing by using hierarchical image structures generated with respect to the respective areas corresponding to each other between input images. Referring to FIG. 10, the image processing unit 330 of the image processing apparatus 100 may repeatedly obtain a weighted average of the values of the matching pixels included in the hierarchical images generated with respect to the reference tile images and the target tile images corresponding to the reference tile images by using a different weighted value of a pixel value included in the hierarchical images generated with respect to the target tile image, based on the similarity between the matching pixel values included in the hierarchical images generated with respect to the reference tile images and the target tile images corresponding to the reference tile images. The image processing unit 330 may repeatedly perform image processing by using a result of image processing at a certain level of the hierarchical image structures from the highest level to the lowest level of the hierarchical image structure for image processing of a next lower level. A process of repeatedly performing image processing in the matching areas between the input images 110, for example, in the reference tile image 212 and the target tile image 232 corresponding to the reference tile image 212, is described below.

The hierarchical image determination unit 334 may determine hierarchical image information of a current level in the hierarchical image structure generated by the hierarchical image structure generation unit 332 (S1010). The hierarchical image determination unit 334 may determine the hierarchical image information of a current level by reflecting a result of image processing of a previous level. For the highest level, since no previous level exists, hierarchical image information of the highest level is used without a change. When a level is not the highest level, new hierarchical image information of a current level may be determined by projecting a differential image between the image information of a result of the image processing at a previous upper level and hierarchical image information before the image processing toward a current level to be reflected in the hierarchical image information of the current level.

The second movement information determination unit 336 may determine the second movement information indicating a degree of movement of the target tile image 232 relative to the reference tile image 212 (S1020). The second movement information determination unit 336 may estimate or update the second movement information with respect to the images of the same level in the hierarchical image structure with respect to the reference tile image 212 and the hierarchical image structure with respect to the target tile image 232. The second movement information of the current level may be simply updated by estimating the second movement information with respect to the images of the highest level and by using the second movement information of a previous level with respect to images that are not at the highest level.

The block area searching unit 340 may search for a block area of the target tile image 232 that matches a block area of the reference tile image 212, set by the block area setting unit 338 (S1030). The block area setting unit 338 may set block areas having a smaller size than that of the reference tile image 212 to process local movement in the reference tile image 212 and the target tile image 232. The block area setting unit 338 may set block areas with respect to the hierarchical image of each level in the hierarchical image structure with respect to the reference tile image 212. The block area searching unit 340 may search for a block area having a pattern that matches a pattern of the block areas of the reference tile image 212, within a search area set based on the second movement information. When the searching process in the target tile image 232 is completed, matching block areas by as many as the number of target images 230 input with respect to each block area of the reference tile image 212 may be searched for.

The block area processing unit 342 may repeatedly perform image processing on all block areas of the reference tile image 212 based on the similarity of pixel values of the matching block areas between the reference tile image 212 and the target tile image 232 (S1040). For example, the block area processing unit 342 may perform image processing such as noise removal, detail enhancement, contrast improvement, etc. by using pixel values of the matching block areas between the reference tile image 212 and the target tile image 232. The block area processing unit 342 may perform image processing by using the weighted average of the matching pixel values included in the hierarchical image of the current level in the hierarchical image structure generated with respect to the reference tile image 212 and the target tile image 232 corresponding to the reference tile image 212, as a value of the pixels included in the hierarchical image of the current level of the reference tile image 212.

The block area processing unit 342 may determine whether image processing has been performed on all block areas in the reference tile image 212 (S1050). If the image processing has not been completed, an operation S1030 is performed. Otherwise, an operation S1060 is performed.

When the image processing is completely performed on all block areas of the reference tile image 212, the block area processing unit 342 may determine whether the current level is the lowest level by checking a level of the hierarchical image that has completed image processing in the hierarchical image structure (S1060). When the block area processing unit 342 checks the level of the hierarchical image structure and determines that the current level is the lowest level, the image processing on the reference tile image 212 may be considered to be completed. In contrast, when the current level is not the lowest level, the level is lowered by one level (S1070). For a hierarchical image having a level that is lower than the current level by one level, the image process of the current level may be performed in the image processing method that is performed at the previous level.

Referring back to FIG. 9, the image processing apparatus 100 generates an output image by using pixel values according to the repeated image processing (S940). The image processing apparatus 100 may obtain the reference tile images 212 that are image processed by using the weighted average of the matching pixel values included in the hierarchical images generated with respect to the reference tile images and the target tile images corresponding to the reference tile images, as values of pixels included in the reference tile images 212, and synthesize the obtained reference tile images 212 to generate an output image.

As described above, according to the one or more of the above embodiments, ghost degradation that may be generated when a high-quality image is generated by using a plurality of input images may be removed.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors or processing elements to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computing devices connected through a network and computer-readable codes or program instructions may be stored and executed in a decentralized manner by processors or processing elements. In addition, the computer-readable storage media may also be embodied in at least one application specific integrated circuit (ASIC) or Field Programmable Gate Array (FPGA).

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims and their equivalents.

What is claimed is:

1. An image processing method comprising:

searching for areas matching each other between a plurality of input images, which comprise a reference image and a target image, to thereby obtain an area of the reference image and an area of the target image matching each other;

generating hierarchical image structures having levels corresponding to different, respective resolutions, with a higher of the levels corresponding to a lower of the different resolutions, the hierarchical image structures including a first hierarchical image structure having a first plurality of hierarchical images, respectively having the different resolutions, for the area of the reference image, and a second hierarchical image structure having a second plurality of hierarchical images, respectively having the different resolutions, for the area of the target image;

for each of the levels of the hierarchical image structures from a highest to a lowest of the levels, performing image processing by searching for a first block area, of a hierarchical image of a current level of the first plurality of hierarchical images, and a second block area, of a hierarchical image of the current level of the second plurality of hierarchical images, that match each other, the searching for block areas performed such that when the current level is lower than the highest of the levels, the searching for block areas is based on a result of image processing performed for a previous higher level, determining weighted values of pixels in the block areas based on an amount of similarity between pixels in the hierarchical images of the current level of, respectively, the first plurality and second plurality of hierarchical images, and determining pixel values based on the weighted values;
generating, using at least one processor, an output image by using the pixel values determined according to the image processing performed for the levels of the hierarchical image structures.

2. The image processing method of claim 1, wherein, for each of the levels of the hierarchical image structures from a highest to a lowest of the levels, in the performing of image processing,
a weighted average of the values of the matching pixels included the hierarchical images of the current level of, respectively, the first plurality and second plurality of hierarchical images is obtained by increasing the weighted average, as a similarity between a value of a pixel included in a hierarchical image generated for each area of the reference image and a value of a pixel included in an hierarchical image generated for each area of the target image increases.

3. The image processing method of claim 1, wherein, for each of the levels of the hierarchical image structures from a highest to a lowest of the levels, in the performing of image processing,
luminance information and chromatic information of the values of the matching pixels included in the hierarchical images of the current level of, respectively, the first plurality and second plurality of hierarchical images are used for determination of the similarity.

4. The image processing method of claim 1, wherein, for each of the levels of the hierarchical image structures from a highest to a lowest of the levels, in the performing of image processing, second movement information between the areas matching each other is estimated based on first movement information between the reference image and the target image, and the matching pixels included in the hierarchical images, of the current level of, respectively, the first plurality and second plurality of hierarchical images, are searched for based on the second movement information.

5. The image processing method of claim 1, wherein the generated hierarchical image structures have a Gaussian pyramid image structure.

6. The image processing method of claim 1, wherein, in the generating of the hierarchical image structures, the hierarchical image structures are generated for each image channel forming each area of the plurality of input images.

7. The image processing method of claim 1, wherein the searching of the areas matching each other between the plurality of input images comprises:
dividing the reference image into a plurality of reference tile images;
dividing the target image into a plurality of target tile images; and
matching the target tile images to the reference tile images based on a position of each of the reference tile images.

8. The image processing method of claim 7, wherein
in the generating hierarchical image structures, a plurality of hierarchical images are generated for each of the reference tile images and the target tile images, and
for each of the levels of the hierarchical image structures from a highest to a lowest of the levels, in the performing of image processing, a weighted average of the values of the matching pixels included the plurality of hierarchical images generated for each of the reference tile images and the target tile images corresponding to the reference tile images is obtained by using a different weighted value of a pixel included in the plurality of hierarchical images generated for the target tile image, based on a similarity between the values of the matching pixels included in the plurality of hierarchical images generated for the reference tile images and the target tile images corresponding to the reference tile images.

9. The image processing method of claim 8, wherein the generating of the output image comprises:
obtaining reference tile images that are image processed by using the weighted average of the values of the matching pixels included in the plurality of hierarchical images generated for each of the reference tile images and the target tile images corresponding to the reference tile images, as values of pixels included in the reference tile images; and
combining the obtained reference tile images.

10. At least one non-transitory computer readable medium storing computer readable instructions that when executed control at least one processor to implement the method of claim 1.

11. An image processing apparatus, comprising:
at least one processor configured to:
search for areas matching each other between a plurality of input images, which comprise a reference image and a target image, to thereby obtain an area of the reference image and an area of the target image matching each other;
generate hierarchical image structures having levels corresponding to different, respective resolutions, with a higher of the levels corresponding to a lower of the different resolutions, the hierarchical image structures including
a first hierarchical image structure a first plurality of hierarchical images, respectively having the different resolutions, for the areas of the reference image, and
a second hierarchical image structure having a second plurality of hierarchical images, respectively having the different resolutions, for the area of the target image;
for each of the levels of the hierarchical image structures from a highest to a lowest of the levels, performs image processing by
searching for a first block area, of a hierarchical image of a current level of the first plurality of hierarchical images, and a second block area, of a hierarchical image of the current level of the second plurality of hierarchical images, that match each other, the searching for block areas performed such that when the current level is lower than the highest of the levels, the searching for block areas is based on a result of image processing performed for a previous higher level,
determining weighted values of pixels in the block areas based on an amount of similarity between pixels in the hierarchical images of the current level of, respectively, the first plurality and second plurality of hierarchical images, and
determining pixel values based on the weighted values; and
generate an output image by using the pixel values according to the repeated image processing performed for the levels of the hierarchical image structures.

12. The image processing apparatus of claim 11, wherein, for each of the levels of the hierarchical image structures from a highest to a lowest of the levels, in performing the image processing,
the at least one processor obtains a weighted average of the values of the matching pixels included the hierarchical images of the current level of, respectively, the first plurality and second plurality of hierarchical images by increasing the weighted average, as a similarity between a value of a pixel included in an hierarchical image generated for each area of the reference image and a value of a pixel included in an hierarchical image generated for each area of the target image increases.

13. The image processing apparatus of claim 11, wherein, for each of the levels of the hierarchical image structures from a highest to a lowest of the levels, in performing the image processing,
the image processor uses luminance information and chromatic information of the values of the matching pixels included in the hierarchical images of the current level of, respectively, the first plurality and second plurality of hierarchical images generated for each area of the reference image and the target image for determination of the similarity.

14. The image processing apparatus of claim 11, wherein, for each of the levels of the hierarchical image structures from a highest to a lowest of the levels, in performing the image processing,
the at least one processor estimates second movement information between the areas matching each other based on the first movement information between the reference image and the target image, and searches for the matching pixels included in the hierarchical images of the current level of, respectively, the first plurality and second plurality of hierarchical images based on the second movement information.

15. The image processing apparatus of claim 11, wherein the generated hierarchical image structures have a Gaussian pyramid image structure.

16. The image processing apparatus of claim 11, wherein the image processor generates the hierarchical image structures for each image channel forming each area of the plurality of input images.

17. The image processing method of claim 1, wherein, for each of the levels of the hierarchical image structures from a highest to a lowest of the levels,
the performing of image processing further comprises determining movement information indicating a degree of movement between the first block area and the second block area,
the searching for block areas is based on the determined movement information, and
when the current level is lower than the highest of the levels,
the result of image processing performed for the previous level includes movement information of the previous level, and
the determining movement information uses the movement information of the previous level as a default value.

* * * * *